(12) United States Patent
Solis

(10) Patent No.: US 6,208,042 B1
(45) Date of Patent: Mar. 27, 2001

(54) ANTI-REACTIVATION SAFETY DEVICE

(76) Inventor: Gilbert Solis, 1202 Buena Vista St., San Antonio, TX (US) 78207

( * ) Notice: Subject to any disclaimer, the term of this patent is extended or adjusted under 35 U.S.C. 154(b) by 0 days.

(21) Appl. No.: 09/286,491

(22) Filed: Apr. 5, 1999

(51) Int. Cl.[7] .................................................. H02H 3/24
(52) U.S. Cl. ........................ 307/125; 361/170; 361/189
(58) Field of Search ........................ 307/125, 132 E, 307/116, 43, 130, 131; 361/140, 160, 170, 189

(56) References Cited

U.S. PATENT DOCUMENTS

| | | | |
|---|---|---|---|
| 2,985,800 | 5/1961 | Cook | 317/13 |
| 3,718,839 | 2/1973 | Conti et al. | 317/31 |
| 3,958,164 | 5/1976 | Hess | 318/431 |
| 4,086,643 | 4/1978 | Jacobs | 361/92 |
| 4,451,865 | * 5/1984 | Warner et al. | 361/23 |
| 4,466,040 | * 8/1984 | Barthel et al. | 361/92 |
| 4,853,821 | 8/1989 | Lewis | 361/92 |
| 5,424,894 | 6/1995 | Briscall et al. | 361/45 |
| 5,723,914 | 3/1998 | Nakayama et al. | 307/125 |

* cited by examiner

*Primary Examiner*—Albert W. Paladini
(74) *Attorney, Agent, or Firm*—Christopher L. Makay

(57) ABSTRACT

An anti-reactivation safety device for an electrical load-bearing device, including a power input line for delivering current from a power source across the anti-reactivation device to the load-bearing device. A current transfer switch positioned along the power-input line is provided. The current transfer switch includes a switch for engagement in an open position and in a closed position to thereby control the flow of current across the power-input line. The anti-reactivation safety device further includes a power return line. A latch circuit, linked with the power return line and with the current transfer switch, is provided for biasing the switch in an open position and in a closed position. The latch circuit includes a current divider. The anti-reactivation safety device includes a load sensor circuit for selectively engaging the latch circuit. The load sensor circuit includes a first line linked with the current transfer switch and a second line linked with the current divider of the latch circuit and linked with the power return line.

13 Claims, 6 Drawing Sheets

ANTI-REACTIVATION SAFETY DEVICE

BACKGROUND OF THE INVENTION

1. Field of the Invention

The present invention relates to safety devices for electrical appliances, tools, and the like and, more particularly, but not by way of limitation, to a safety device that will prevent activation of an electrical appliance, tool, and the like upon the application or reapplication of power when an activation switch of the electrical appliance, tool, and the like has been left in a closed position.

2. Description of the Related Art

Electric appliances, tools, and the like include a power cord that inserts into a power delivery device which may be a generator but is most likely a standard AC outlet. Electrical appliances, tools, and the like include an activation switch that, when closed, permits the delivery of power to the electrical appliance, tool, and the like. If this activation switch is closed when the electrical appliance, tool, and the like is "plugged in", the electrical appliance, tool, and the like will immediately power on. Similarly, when the activation switch remains closed after a power failure, the electrical appliance, tool, and the like will power on upon the reapplication of power. The unwanted activation of an electrical appliance, tool, and the like is highly undesirable because, at a minimum, property damage could result or, more importantly, dismemberment or even a death could occur.

Various devices have been designed to prevent inadvertent operation of an electric appliance, tool, and the like. These devices operate adequately, but still suffer disadvantages. Certain of the devices will not prevent inadvertent operation under some conditions, while others are expensive and complicated to manufacture. Accordingly, a safety device that will prevent inadvertent operation of electric appliances, tools, and the like under all conditions, yet is inexpensive and easy to manufacture is a highly desirable improvement over present safety devices.

SUMMARY OF THE INVENTION

In accordance with the present invention, an anti-reactivation safety device for an electrical load bearing device, includes a power input line for delivering current from a power source across the anti-reactivation device to the load bearing device. A current transfer switch positioned along the power-input line is provided. The current transfer switch includes a switch such as a thyristor or a relay for engagement in an open position and in a closed position to thereby control the flow of current across the power input line. The switch is normally in an open position.

The anti-reactivation safety device further includes a power return line. A latch circuit, linked with the power return line and linked with the current transfer switch, is provided for biasing the switch in an open position and in a closed position. The latch circuit includes a current divider. The anti-reactivation safety device includes a load sensor circuit for selectively engaging the latch circuit. The load sensor circuit includes a first line linked with the current transfer switch and a second line linked with the current divider of the latch circuit and linked with the power return line. In particular, the load sensor circuit may include an optoisolator for transferring current from the first line to the second line.

The anti-reactivation safety device may further include a control voltage step down and rectifier unit positioned along the power-input line for providing DC power to the latch circuit, the current transfer switch, and the load sensor. The control voltage step down and rectifier unit includes a voltage regulator for providing regulated DC power therefrom.

Accordingly, the load-bearing device includes a load bearing switch for selectively engaging the load-bearing device in an on position and in an off position. The load-bearing switch, while initially in an on position, completes a circuit provided by the anti-reactivation safety device, via the power input line and the power return line. As such, current flows across the power input line to the load sensor circuit, transfers from the first line to the second line, and flows across the current divider of the latch circuit. The current divider sufficiently draws current away from the latch circuit and the switch of the current transfer switch to render the switch in an open position, thereby safely preventing the load bearing device from powering up.

While initially in an off position, the load bearing switch does not complete a circuit provided by the anti-reactivation safety device, via the power input line and the power return line. As such, current only flows across the power input line to the latch circuit. The latch circuit receives sufficient current to bias the switch of the current transfer switch in a closed position, thereby enabling the load bearing device to power up upon election thereafter.

In one embodiment, an anti-reactivation safety device is integrally linked with a load bearing device, thereby defining a component of the load bearing device. Alternatively, one embodiment contemplates an anti-reactivation safety device as an independent unit. Accordingly, the independent anti-reactivation safety device includes a plug linked with the power input line and with the power return line for extracting power from a power source through the anti-reactivation safety device. The independent anti-reactivation safety device further includes a load-interface outlet linked with the power input line and with the power return line for facilitating connection with a load bearing device therefrom.

It is therefore an object of the present invention to provide an anti-reactivation safety device that will prevent activation of an electrical load bearing device upon the application or reapplication of power when an activation switch of the electrical load bearing device has been left in a closed or "on" position.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. The figures are not necessarily to scale and some features may be exaggerated to show details of particular components or steps.

Figure 1:
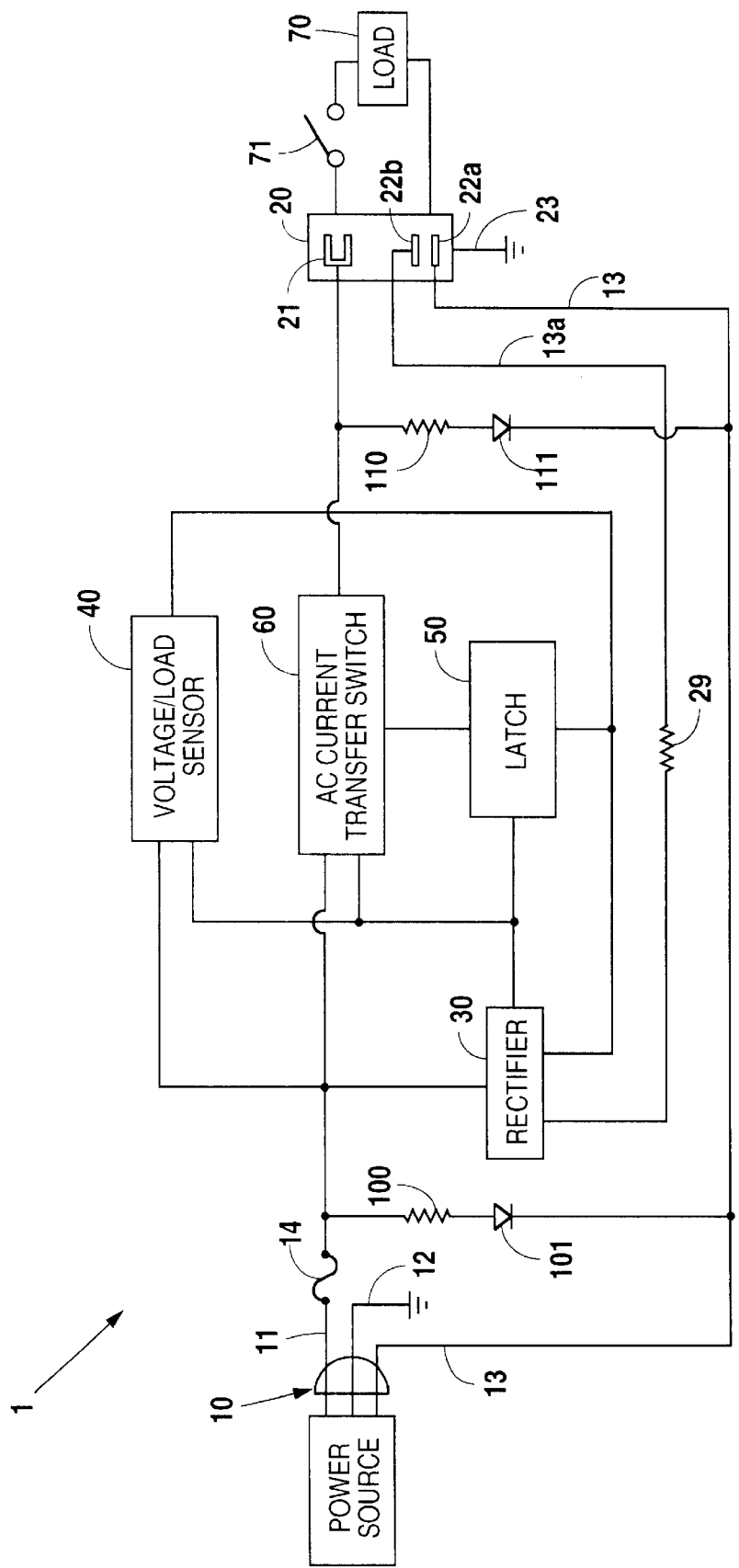
FIG. 1 is a schematic view illustrating an anti-reactivation safety device as electrically coupled to a load-bearing electrical device via an outlet provided by the safety device.
Figure 4:
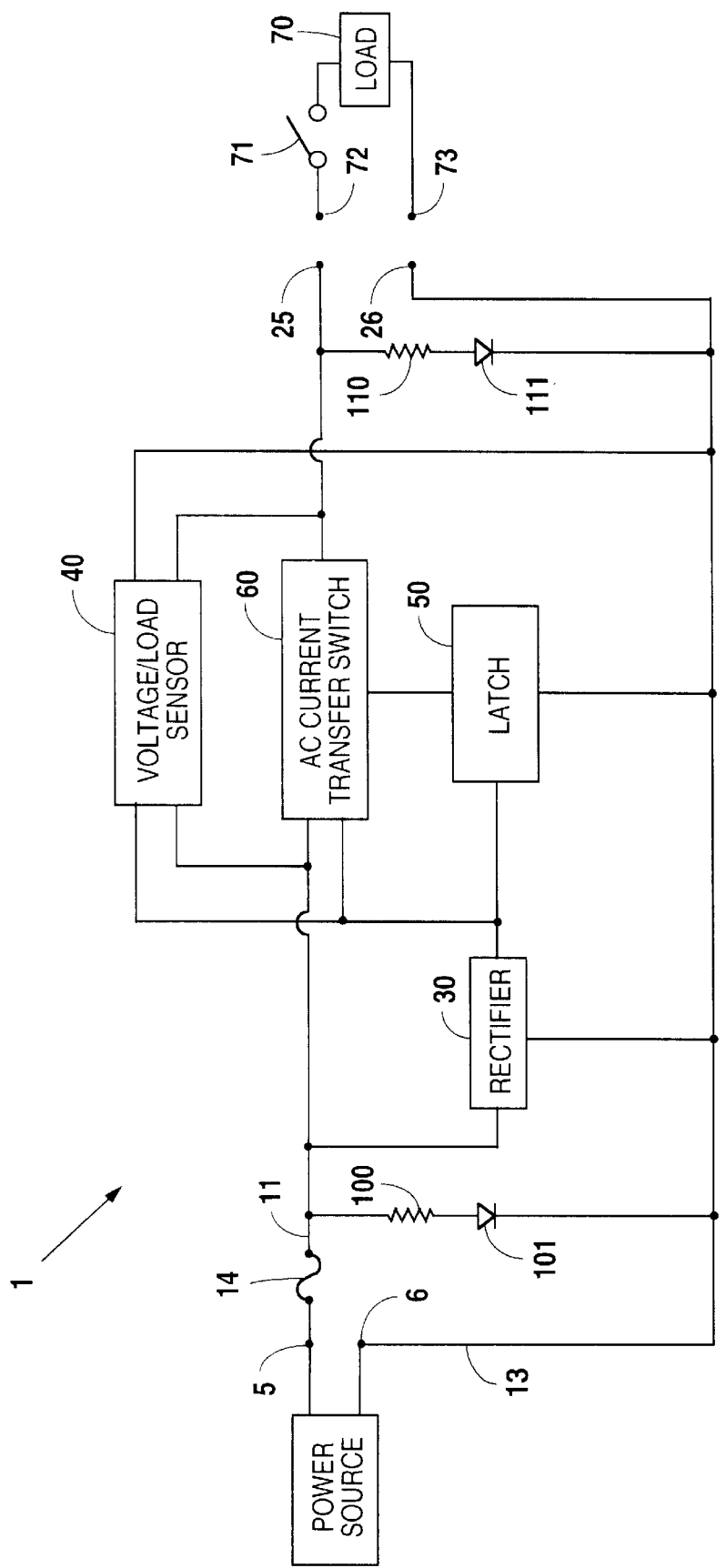
FIG. 4 is a schematic view illustrating an anti-reactivation safety device as electrically incorporated within a load-bearing electrical device.

FIGS. 1 and 4 illustrate two separate embodiments of the invention. FIG. 1 illustrates an anti-reactivation safety device as an independent or "stand-alone" unit, coupled at one end to a power source and coupled at an opposing end to a load-bearing device such as an electrical appliance, tool, and the like. FIG. 4 illustrates an anti-reactivation safety device as a component incorporated within a load-bearing device.

As illustrated in FIG. 1, an anti-reactivation safety device 1 comprises a plug 10 connected to a power source (not shown). Plug 10 includes a grounding outlet 12, a power input line 11, and a power return line 13. In this preferred embodiment, plug 10 inserts into a standard wall outlet although those skilled in the art may contemplate insertion into other power delivery devices such as, but not limited to, generators. The anti-reactivation safety device 1 comprises an AC current transfer switch 60 serially connected with plug 10 along power input line 11. The anti-reactivation device 1 further comprises a control voltage step down and rectifier unit 30 along power input line 11 and in parallel with the AC current transfer switch 60.

The anti-reactivation safety device 1 further comprises a voltage/load sensor 40 and a latch 50 whereby the voltage/load sensor 40 and the latch 50 are in parallel with the AC current transfer switch 60. The control voltage step down and rectifier unit 30 includes a voltage regulator 39. Accordingly, control voltage step down and rectifier unit 30 provides low voltage, low current, regulated DC to power the voltage/load sensor 40, the latch 50, and the AC current transfer switch 60.

The anti-reactivation safety device 1 of FIG. 1 comprises a load-interface outlet 20. The load-interface outlet 20 includes a ground outlet 23, a first terminal 21 in communication with the power input line 11, and a second terminal 22 in communication with the power return line 13 and with a switch return line 13a. Switch return line 13a provides the anti-reactivation safety device 1 with a return supply path for the control voltage step down and rectifier unit 30 to, thus, enable the voltage/load sensor 40, the latch 50, and, ultimately, the AC current transfer switch 60.

At load-interface outlet 20, the anti-reactivation safety device 1 is electrically coupled to a load-bearing device 70. The load-bearing device 70 includes a load switch 71 for turning the device in an "on" or an "off" position.

In operation, an initial small sample current is sent across power input line 11 and through voltage/load sensor 40 to bypass current transfer switch 60. Thus, if load switch 71 is initially left in a closed or "on" position, load-bearing device 70 at power up will complete a circuit through the anti-reactivation safety device 1. A completed circuit enables the anti-reactivation safety device 1 to "latch-off" or render current transfer switch 60 in an open position and, hence, safely preventing the reactivation of load-bearing device 70.

In a similar manner, if load switch 71 is initially left in an open or "off" position, load-bearing device 70 at power up would not provide a complete circuit across the anti-reactivation safety device 1. An incomplete circuit allows the anti-reactivation safety device 1 to "latch-on" or render current transfer switch 60 in a closed position and, thus, allowing the load-bearing device 70 to fully power up when a user ultimately elects to advance load switch 71 from the "off" to an "on" position.

Furthermore, the anti-reactivation safety device 1 may include operational indicators. In particular, resistor 100 and diode 101 are positioned between power input line 11 and power return line 13 generally adjacent to plug 10. Diode 101 indicates that anti-reactivation safety device 1 is operational. Resistor 110 and diode 111 are positioned between power input line 11 and power return line 13 generally adjacent to load-interface outlet 20. Diode 111 indicates power is being delivered to load-bearing device 70, when fully powered up, from the anti-reactivation safety device 1. In this preferred embodiment, diodes 101 and 111 are light emitting diodes. Additionally, the anti-reactivation safety device 1 may include a fuse 14, adjacent plug 10, that engages when there is an undesirably high level of current drawn across power input line 11.

Figure 2:
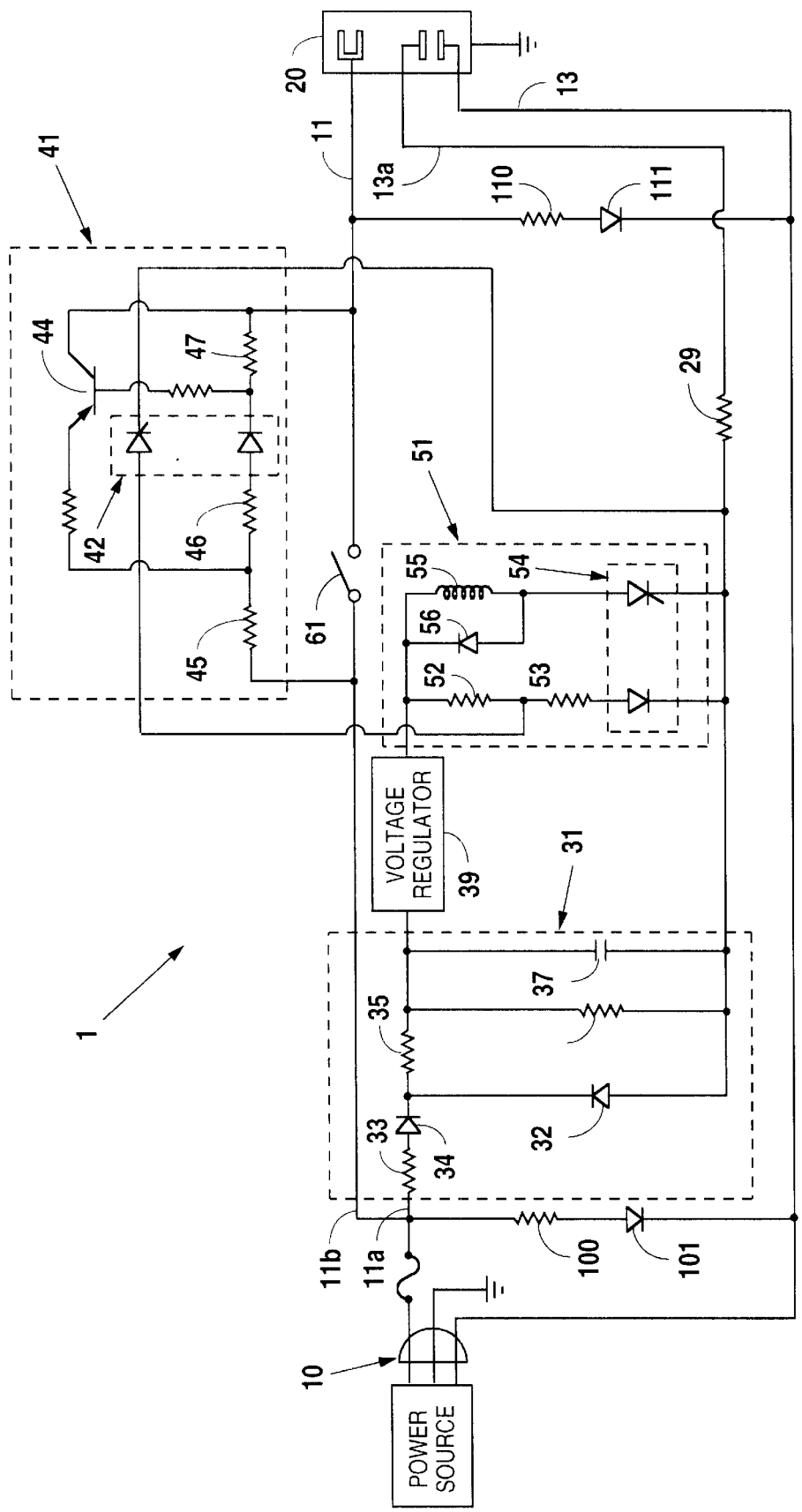
FIG. 2 illustrates the anti-reactivation safety device of FIG. 1 wherein an AC current transfer switch comprises a relay.
Figure 3:
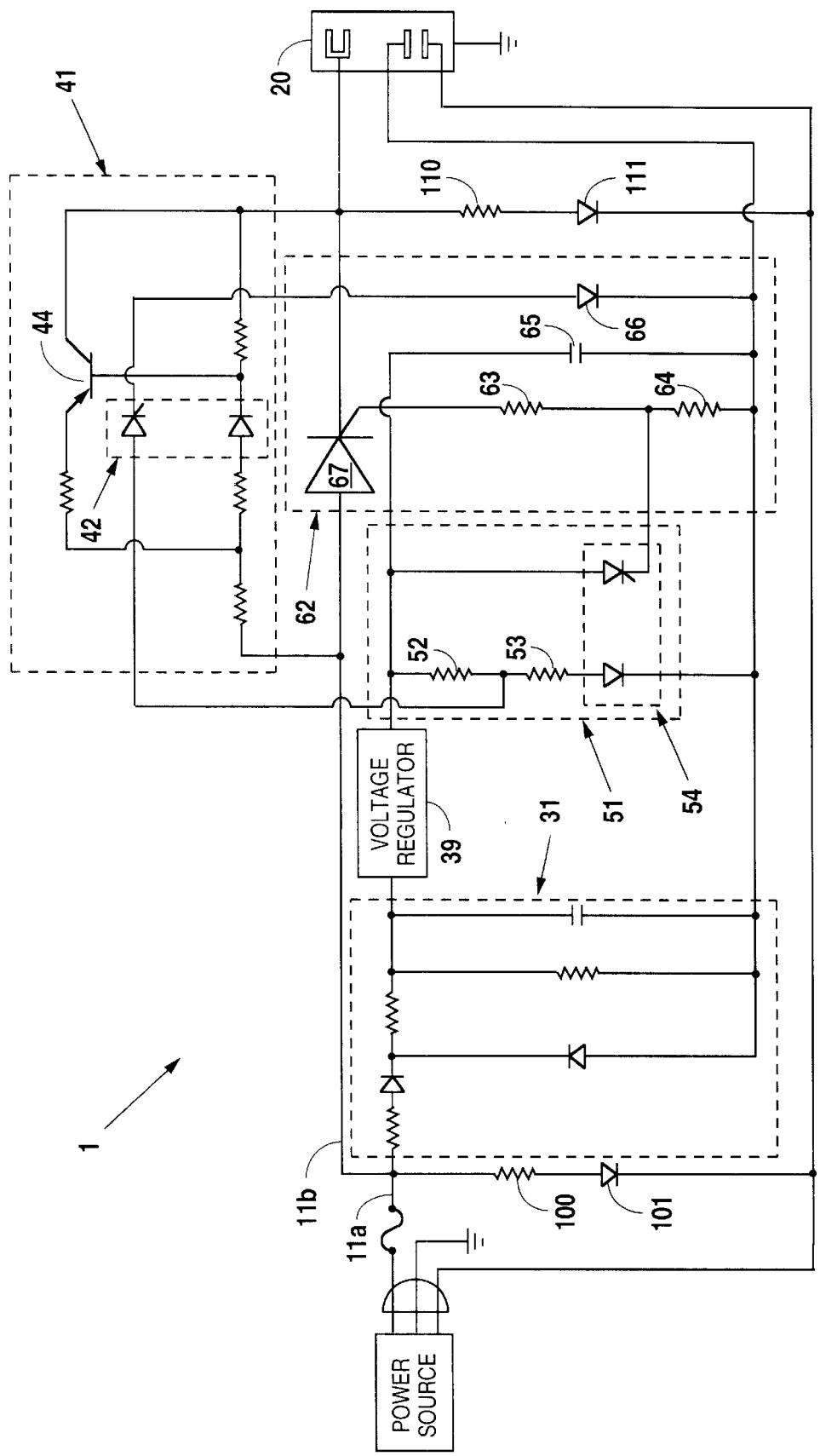
FIG. 3 illustrates the anti-reactivation safety device of FIG. 1 wherein an AC current transfer switch comprises a thyristor.

FIGS. 2 and 3 depict the anti-reactivation safety device 1 of FIG. 1 in greater detail. Additionally, FIG. 2 features a relay switch 61 as the preferred AC current transfer switch 60. FIG. 3 features a thyristor circuit 62 with SCR switch 67 as the preferred AC current transfer switch 60.

Specifically, in FIG. 2, a rectifier circuit 31 is shown. Rectifier circuit 31 includes a resistor 33 and a first rectifier diode 34 connected in series. A second rectifier diode 32 is connected in parallel with the first rectifier diode 34 such that the first and second rectifier diodes 34 and 32, respectively, convert AC into DC power. Rectifier circuit 31 also includes a current divider, a resistor 35 and a resistor 36. The rectifier circuit 31 also includes a capacitor 37 that aids in smoothing the DC signal created as a result of diodes 34 and 32.

A voltage/load sensor circuit 41 in FIG. 2 includes a first sensor resistor 45, a second sensor resistor 46, a first light emitting diode from an optoisolator 42, and a third sensor resistor 47 all connected in series and providing a path for the initial small sample current to bypass relay switch 61. In operation, if load switch 71 of load-bearing device 70 is left in a closed position, completing a circuit through the anti-reactivation safety device 1, the first light emitting diode activates a second photoelectric diode from optoisolator 42. The second photoelectric diode, in turn, bleeds off current to ultimately render relay switch 61 open and, thus, prevent the reactivation of load-bearing device 70. If load switch 71 is left in an open position and the circuit across the anti-reactivation safety device 1 is incomplete, optoisolator 42 will not be activated and, ultimately, render relay switch 61 closed.

The voltage/load sensor circuit 41 includes a transistor 44 connected in parallel to optoisolator 42 between the first sensor resistor 45 and the second sensor resistor 46 and between the first light emitting diode of optoisolator 42 and the third sensor resistor 47. Transistor 44 is provided to protect optoisolator 42 from harmful, excessive current when activated by allowing excess current to bypass optoisolator 42. In addition, the base, emitter, and collector of transistor 44 include resistors for limiting current delivered to transistor 44. Although optoisolators are preferred, those skilled in the art will readily recognize other suitable and equivalent substitutes, such as, but not limited to, inductors.

A latch circuit 51 in FIG. 2 includes a first latch resistor 52, a second latch resistor 53, and a first light emitting diode from an optoisolator 54 all connected in series. First latch resistor 52 and second latch resistor 53 form a current divider that draws current away from optoisolator 54 when optoisolator 42 is activated due to the undesired closure of the load switch 71. While load switch 71 is in an open position, the first light emitting diode from optoisolator 54 receives enough current to activate a second photoelectric diode from optoisolator 54. The second photoelectric diode from optoisolator 54 allows current to pass through a relay formed by a relay diode 56, a coil 55, and the relay switch 61, thereby closing relay switch 61. Although an optoisolator is preferred within latch circuit 51, those skilled in the art may readily recognize other suitable and equivalent substitutes, such as, but not limited to, discrete SCR-traics or op-amps/logic-amps that include various types of transistors. Moreover, although an electromechanical relay comprises the preferred relay switch 61 for the circuit of FIG. 2, those skilled in the art may readily recognize other suitable and equivalent substitutes, such as, but not limited to, a solid-state relay or a thyristor device (see FIG. 3).

For operation of the circuit shown in FIG. 2, plug 10 is inserted into a standard wall outlet and a load-bearing device 70 to be operated is plugged into load-interface outlet 20. Once plugged in, current flows across power input line 11 while activating diode 101 indicating that anti-reactivation safety device 1 is operational. Current flows across rectifier circuit 31 and across voltage/load sensor circuit 41.

In particular, if load switch 71 is in an open position while a user wishes to power up the load bearing device 70 either after interruption of power or if plugged in for the first time, the initial small sample current flows through power input line 11 and branches off in a first direction 11a and in a second direction 11b. Load switch 71 in an "off" position does not complete the circuit provided by the anti-reactivation safety device 1 so that the initial small sample current does not flow through load bearing device 70 and back through anti-reactivation safety device 1. An incomplete circuit only provides for current flow across the power input line 1. Thus, while flowing across the first direction 11a, the initial small sample current flows across rectifier circuit 31 to voltage rectifier 39 and, thus, is converted to DC power. Capacitor 37 smoothes the resulting DC signal created by diodes 34 and 32. The resulting DC signal flows through the current divider formed by the first and second latch resistors 52 and 53, respectively, to optoisolator 54. In this preferred embodiment, a path across switch return line 13a, across resistor 29, is provided for unwanted current from optoisolator 54.

While load switch 71 is in an "off" position, enough current is drawn through the first direction 11a to activate optoisolator 54. As such, the first light emitting diode activates the second photoelectric diode from optoisolator 54. The second photoelectric diode allows current to pass through the relay formed by relay diode 56, coil 55, and relay switch 61, thereby closing relay switch 61. It should also be added that relay switch 61 is normally open if not activated by optoisolator 54. An open relay switch 61 thus directs the initial small sample current from the second direction 11b across the voltage/load sensor circuit 41.

Accordingly, while load switch 71 is in an open position, an insufficient amount of current is drawn across the first light emitting diode of optoisolator 42 of the second direction 11b to activate the second photoelectric diode. Inasmuch, a closed relay switch 61 will provide a sufficient amount of current, larger than the initial small sample current, to fully power up the load bearing device 70 when the user elects to switch the load bearing device 70 from the "off" to an "on" position. Thus, when the user switches the load bearing device 70 to an "on" position, this larger current is accommodated by power return line 13 and bypasses switch return line 13a. This larger current flows across power return line 13 and activates diode 110 indicating that power is being delivered to operate load-bearing device 70.

Alternatively, if load switch 71 is in an closed position while a user wishes to power up the load bearing device 70 either after interruption of power or if plugged in for the first time, the initial small sample current flows through power input line 11 and branches off in a first direction 11a and in a second direction 11b. Load switch 71 in an "on" position completes the circuit provided by the anti-reactivation safety device 1 so that the initial small sample current flows through load bearing device 70 and back through anti-reactivation safety device 1. Therefore, while flowing across the second direction 11b, a closed circuit enables the initial small sample current to cause the first light emitting diode to activate the second photoelectric diode of optoisolator 42.

Thus, while the load bearing device 70 is in an "on" position, the initial small sample current follows a path dictated by the second photoelectric diode of optoisolator 42 back through switch return line 13a, across the rectifier circuit 31 and voltage rectifier 39 to the current divider formed by resistors 52 and 53. In particular, the second photoelectric diode of optoisolator 42 is linked, via an input line, to the current divider between resistors 52 and 53 so as to draw the initial small sample current away from optoisolator 54 and, ultimately, not engage the relay in that relay switch 61 remains in its normally open position. The initial small sample current will continue to travel about the path defined by the second photoelectric diode of optoisolator 42 as long as load switch 71 of the load bearing device 70 remains closed, thereby keeping relay switch 61 in an open position.

An open relay switch 61 will not provide a sufficient amount of current, larger than the initial small sample current, to fully power up the load bearing device 70 and, thus, circumventing potential injury to or even death of its user. Thereafter, for a user wishing to use the load bearing device 70, load switch 71 is advanced from the "on" to an "off" position to interrupt the current loop provided by the second photoelectric diode of optoisolator 42. Once load switch 71 is switched "off", relay switch 61 will be rendered in a closed position to fully power up the load bearing device 70 when the user elects to switch the load bearing device 70 from the "off" to an "on" position.

The circuit of FIG. 3 is operationally identical to the circuit of FIG. 2 whereby a relay in FIG. 2 is substituted for a thyristor in FIG. 3. In particular, latch circuit 51, voltage/load sensor circuit 41, and rectifier circuit 31 are the same as in FIG. 2. By contrast, however, thyristor circuit 62 of FIG. 3 comprises a silicon controlled rectifier (SCR) switch 67, a current divider including a resistor 63 and a resistor 64 in series with the gate of SCR switch 67 and electrically coupled with a second photoelectric diode from optoisolator 54 of latch circuit 51, a time delay capacitor 65 in parallel with the second photoelectric diode of optoisolator 54, and a feedback prevention diode 66 in electrical communication with a second photoelectric diode from optoisolator 42 of voltage/load sensor circuit 41. Resistors 63 and 64 limit the current delivered at the gate of SCR switch 67. Time delay capacitor 65 provides a delay allowing for optoisolator 42 of voltage/load sensor circuit 41 to first activate when load switch 71 is in a closed position thereby preventing the activation of optoisolator 54 of latch circuit 51. Feedback prevention diode 66 prevents feedback that could potentially damage optoisolator 42.

For operation of the circuit shown in FIG. 3, plug 10 is inserted into a standard wall outlet and a load-bearing device 70 to be operated is plugged into load-interface outlet 20. Once plugged in, the initial small sample current flows across rectifier circuit 31 and across voltage/load sensor circuit 41.

In particular, if load switch 71 is in an open position while a user wishes to power up the load bearing device 70 either after interruption of power or if plugged in for the first time, the initial small sample current flows through power input line 11 and branches off in a first direction 11a and in a second direction 11b. Load switch 71 in an "off" position does not complete the circuit provided by the anti-reactivation safety device 1 so that the initial small sample current does not flow through load bearing device 70 and back through anti-reactivation safety device 1. An incomplete circuit only provides for current flow across the power input line 11. Thus, while flowing across the first direction 11a, the initial small sample current flows across rectifier circuit 31 to voltage rectifier 39 and, thus, is converted to DC power. The resulting DC signal flows through the current divider formed by the first and second latch resistors 52 and 53, respectively, to optoisolator 54.

While load switch 71 is in an "off" position, enough current is drawn through the first direction 11a to activate optoisolator 54. As such, the first light emitting diode activates the second photoelectric diode from optoisolator 54. The second photoelectric diode allows current to ultimately pass through and engage SCR switch 67. A deactivated SCR switch 67, however, directs the initial small sample current from the second direction 11b across the voltage/load sensor circuit 41.

Accordingly, while load switch 71 is in an open position, an insufficient amount of current is drawn across the first light emitting diode of optoisolator 42 of the second direction 11b to activate the second photoelectric diode. Inasmuch, an engaged SCR switch 67 will provide a sufficient amount of current, larger than the initial small sample current, to fully power up the load bearing device 70 when the user elects to switch the load bearing device 70 from the "off" to an "on" position. Thus, when the user switches the load bearing device 70 to an "on" position, this larger current is accommodated by power return line 13 and bypasses switch return line 13a.

Alternatively, if load switch 71 is in an closed position while a user wishes to power up the load bearing device 70 either after interruption of power or if plugged in for the first time, the initial small sample current flows through power input line 11 and branches off in a first direction 11a and in a second direction 11b. Load switch 71 in an "on" position completes the circuit provided by the anti-reactivation safety device 1 so that the initial small sample current flows through load bearing device 70 and back through anti-reactivation safety device 1. Therefore, while flowing across the second direction 11b, a closed circuit enables the initial small sample current to cause the first light emitting diode to activate the second photoelectric diode of optoisolator 42.

Thus, while the load bearing device 70 is in an "on" position, the initial small sample current follows a path dictated by the second photoelectric diode of optoisolator 42 back through switch return line 13a, across feedback prevention diode 66 and time delay capacitor 65, through the rectifier circuit 31 and voltage rectifier 39 to latch circuit 51. Time delay capacitor 65, while charging, provides enough time for the first light emitting diode of optoisolator 42 to activate the second photoelectric diode of optoisolator 42 while load switch 71 is in its closed position. In particular, the second photoelectric diode of optoisolator 42 is linked, via an input line, between resistors 52 and 53 so as to draw the initial small sample current away from optoisolator 54 and, ultimately, not engage SCR switch 67. The initial small sample current will continue to travel about the path defined by the second photoelectric diode of optoisolator 42 as long as load switch 71 of the load bearing device 70 remains closed, thereby keeping SCR switch 67 in a disengaged position.

A disengaged SCR switch 67 will not provide a sufficient amount of current, larger than the initial small sample current, to fully power up the load bearing device 70 and, thus, circumventing potential injury to or even death of its user. Thereafter, for a user wishing to use the load bearing device 70, load switch 71 is advanced from the "on" to an "off" position to interrupt the current loop provided by the second photoelectric diode of optoisolator 42. Once load switch 71 is switched "off", SCR switch 67 will be rendered in an engaged position to fully power up the load bearing device 70 when the user elects to switch the load bearing device 70 from the "off" to an "on" position.

FIG. 4 illustrates an anti-reactivation safety device 1 as a component incorporated within a load-bearing device 70. In contrast to the anti-reactivation safety device of FIG. 1 that features a plug 10 and a load-interface outlet 20 with a switch return line 13a, the anti-reactivation safety device of FIG. 4 features hard wire connectors. In particular, the anti-reactivation safety device 1 of FIG. 4 comprises a power input line input terminal 5 and a power return line output terminal 6 each in electrical communication with a power source (not shown). The anti-reactivation safety device 1 further comprises a power input line output terminal 25 and a power return line input terminal 26 each in electrical communication with load-bearing device 70.

Like that of FIG. 1, the anti-reactivation safety device 1 of FIG. 4 comprises a control voltage step down and rectifier unit 30 connected between power input line 11 and power return line 13, an AC current transfer switch 60 along power input line 11, a voltage/load sensor 40 in parallel with AC current transfer switch 60, and a latch 50 in parallel with AC current transfer switch 60. In addition, power return line 13 includes ground 23. Furthermore, the anti-reactivation safety device 1 may include operational indicators, diodes 101 and 111. The anti-reactivation safety device 1 may include a fuse 14 connected along power input line 11.

In the same operative manner as in FIG. 1, an initial small sample current is sent across power input line 11 of FIG. 4 and through voltage/load sensor 40 to bypass current transfer switch 60. Thus, if load switch 71 is initially left in a closed or "on" position, load-bearing device 70 at power up would complete a circuit through the anti-reactivation safety device 1. A completed circuit enables the anti-reactivation safety device 1 to "latch-off" or render current transfer switch 60 in an open position. Hence, safely preventing the reactivation of load-bearing device 70. In a similar manner, if load switch 71 is initially left in a open or "off" position, load-bearing device 70 at power up would not provide a complete circuit across the anti-reactivation safety device 1. An incomplete circuit allows the anti-reactivation safety device 1 to "latch-on" or render current transfer switch 60 in a closed position and, thus, allowing the load-bearing device 70 to fully power up when a user ultimately elects to advance load switch 71 from the "off" to an "on" position.

Figure 5:
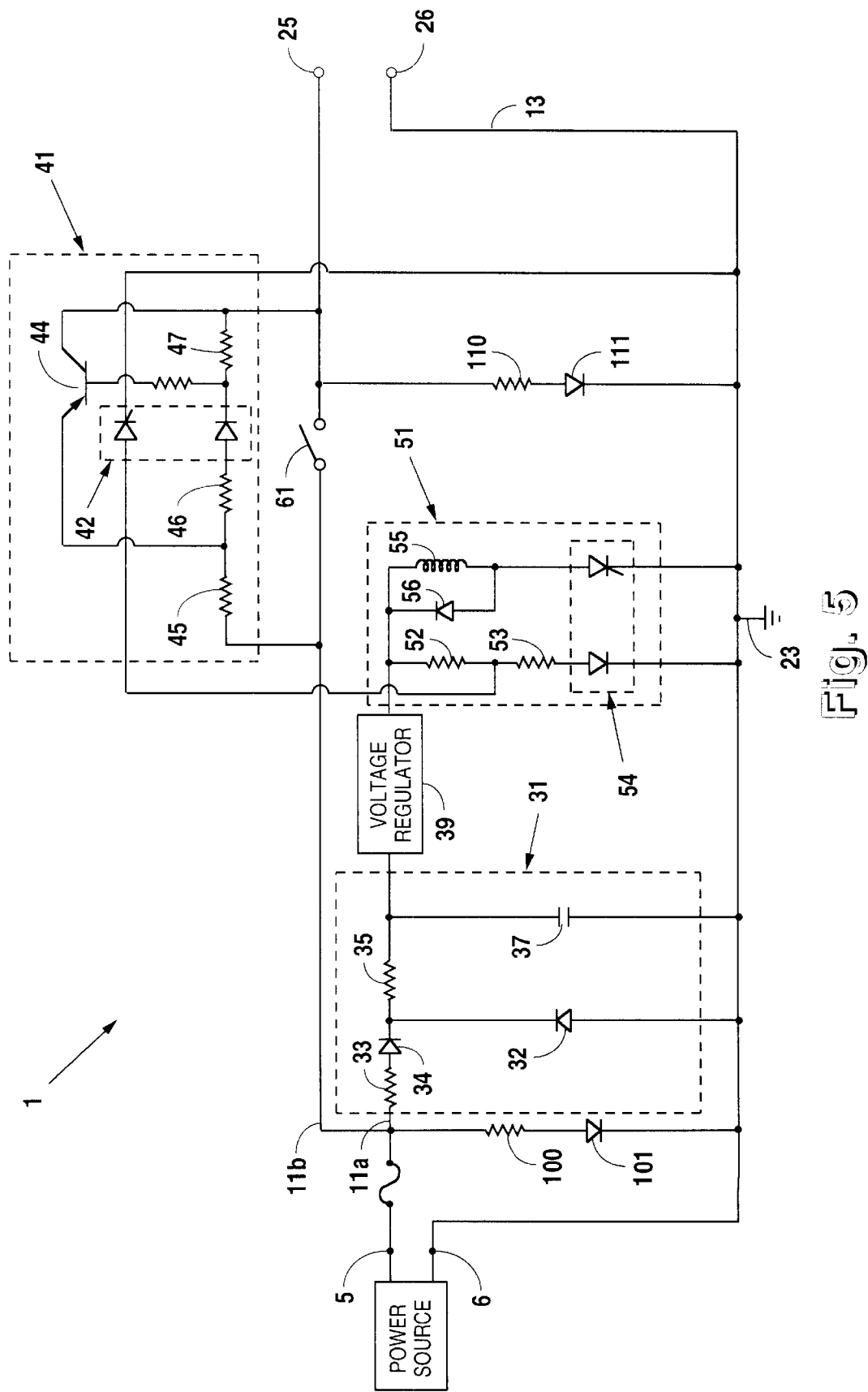
FIG. 5 illustrates the anti-reactivation safety device of FIG. 4 wherein an AC current transfer switch comprises a relay.
Figure 6:
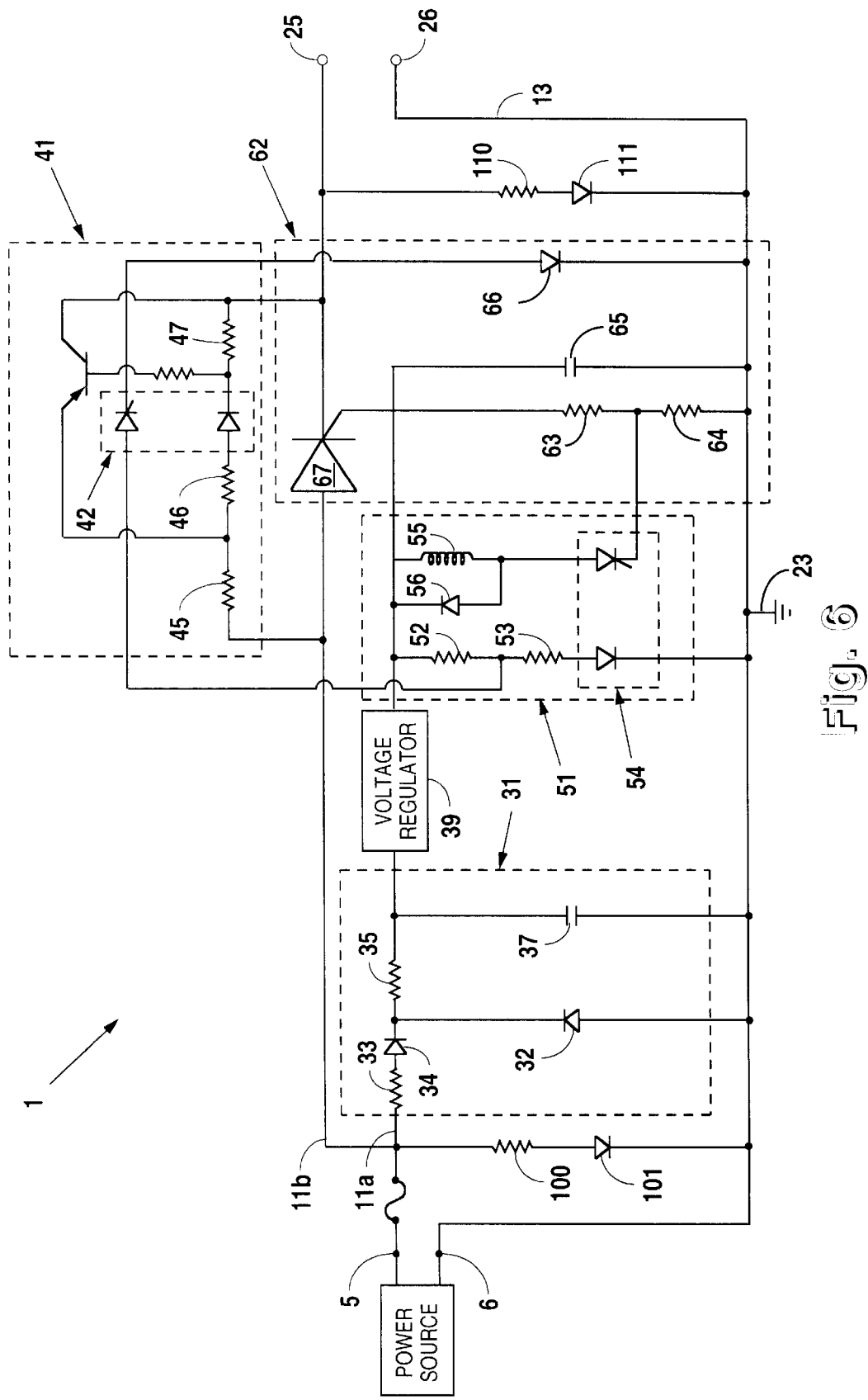
FIG. 6 illustrates the anti-reactivation safety device of FIG. 4 wherein an AC current transfer switch comprises a thyristor.

FIGS. 5 and 6 depict the anti-reactivation safety device 1 of FIG. 4 in greater detail. Additionally, FIG. 5 is operationally identical to the circuit of FIG. 2 described above and features a relay switch 61 as the preferred AC current transfer switch 60. FIG. 6 is operationally identical to the circuit of FIG. 3 described above and features a thyristor circuit 62 with SCR switch 67 as the preferred AC current transfer switch 60.

In FIG. 5, rectifier circuit 31 is similar to the rectifier circuit of FIG. 2. However, by contrast, whereas the rectifier circuit of FIG. 2 includes a current divider, a resistor 35 and a resistor 36, the rectifier circuit 31 of FIG. 5 includes a resistor 35 in parallel with a second rectifier diode 32 and a capacitor 37. It should also be added that, for voltage/load sensor circuit 41 in FIG. 5, the base, emitter, and collector of transistor 44 include resistors limiting current delivered to transistor 44. Latch circuit 51 and relay switch 61 of FIG. 5 are identical to FIG. 2.

In FIG. 6, rectifier circuit 31 and voltage/load sensor circuit 41 are identical to FIG. 5. Latch circuit 51 and thyristor circuit 62 of FIG. 6 are identical to FIG. 3.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. An anti-reaction safety device for an electrical load bearing device, the load bearing device including a load bearing switch for selectively engaging the load bearing device in an on position and in an off position, comprising:

a power input line coupled with a power source for delivering current from the across the anti-reaction safety device to the load bearing device;

a current transfer switch positioned along the power input line for engagement in an open position and a closed position, thereby controlling the flow of current across the power input line;

a power return line;

a latch circuit linked with the power supply line, the power return line and the current transfer switch for biasing the current transfer switch in the open position and the closed position, the latch circuit including a current divider; and a load sensor circuit for selectively engaging the latch circuit, the load sensor circuit including a first line first line linked with the current transfer switch and a second line linked with the current divider of the latch circuit and the power return line, wherein the load bearing switch in an initially on position completes the load sensor circuit via the power input line and the power return line to furnish current flow across the power input line and the completed load sensor circuit to the current divider of the latch circuit.

2. The anti-reaction safety device according to claim 1, wherein the current transfer switch is normally in an open position.

3. The anti-reaction safety device according to claim 1, wherein the current divider substantially draws current away from the latch circuit to render the current transfer switch in an open position, thereby safely preventing the load bearing device from powering up.

4. The anti-reaction safety device according to claim 1, wherein the load bearing switch initially in an off position opens the load sensor circuit provided by the anti-reaction safety device, via the power input line and power return line.

5. The anti-reaction safety device according to claim 4, wherein, when the load bearing switch initially in an off position opens the load sensor circuit, current flows across the power input line to the latch circuit.

6. The anti-reaction safety device according to claim 5, wherein, when current flows across the power input line to the latch circuit, the latch circuit biases the current transfer switch in a closed position, thereby enabling the load bearing device to power up upon election thereafter.

7. The anti-reaction safety device according to claim 1, wherein the current transfer switch comprises a thyristor.

8. The anti-reaction safety device according to claim 1, wherein the current transfer switch comprises a relay.

9. The anti-reactivation safety device according to claim 1 wherein the a load sensor circuit includes an optoisolator for transferring current from the first line to the second line.

10. The anti-reactivation safety device according to claim 1 wherein the anti-reactivation safety device is integrally linked with the load bearing device, thereby defining a component of the load bearing device.

11. The anti-reactivation safety device according to claim 1 further comprising:

a plug linked with the power input line and with the power return line for facilitating the drawing of power from the power source through the anti-reactivation safety device; and a load-interface outlet linked with the power input line and with the power return line, for facilitating the connection with the load bearing device therefrom.

12. The anti-reactivation safety device according to claim 1 further comprising a control voltage step down and rectifier unit positioned along the power input line for providing DC power to the latch circuit, the current transfer switch, and the load sensor.

13. The anti-reactivation safety device according to claim 12 wherein the control voltage step down and rectifier unit includes a voltage regulator for providing regulated DC power therefrom.

* * * * *